United States Patent Office 3,271,352
Patented Sept. 6, 1966

3,271,352
POLYURETHANE COATING FROM MIXED
POLYURETHANE POLYMERS
Marvin Alfred Weinberg, Metuchen, N.J., assignor to Johnson & Johnson, a corporation of New Jersey
No Drawing. Filed Mar. 9, 1965, Ser. No. 438,395
3 Claims. (Cl. 260—37)

This application is a continuation of my pending application Serial No. 39,440, filed June 29, 1960.

The present invention relates to polyurethane compositions. More particularly, the present invention relates to polyurethane compositions suitable as coating compositions.

Polyurethane coating compositions are well known. Their particular physical characteristics can be varied to suit a particular use but it is generally acknowledged that a broadly useful polyurethane coating composition has yet to be found. The deficiencies of the products of the prior art have been brittleness, lack of solvent resistance, softness and poor shelf life.

The present invention has as an object providing a polyurethane coating composition of general usefulness due to an overall balance of its properties. Compositions prepared in accordance with the present invention have good characteristics of elongation, toughness, flexibility, chemical resistance and hardness. They have good shelf life which is further increased by the addition to them of Molecular Sieve material of a type which will pick up water.

Objects and advantages of the invention will be set forth in part hereinafter and in part will be obvious herefrom, or may be learned by practice with the invention, the same being realized and attained by means of the steps, compositions, combinations and improvements pointed out in the appended claims.

These and other objects are accomplished by use of a combination of solid isocyanato terminated polyurethane resin and a liquid isocyanato terminated polyurethane pre-elastomer capable of forming on curing an elastomer. A ratio by weight of pre-elastomer to the combination of resin plus pre-elastomer in the range of 3 to 50% and, preferably, 5 to 20% has been found suitable in the present invention. The amount of isocyanato by weight in the components of the present invention has been found in the final product to be in the range of 3 to 14.8% and, preferably, 4.5 to 9.9%. These ranges are obtained by using resins containing isocyanato groups in the range of 4 to 15% by weight and pre-elastomers containing isocyanato groups in the range of 2 to 9% by weight.

The resins of the present invention may be formed by the reaction in an inert solvent of 1 mole of polypropylene ether glycol having a molecular weight of 950 to 1050; 0 to 1 mole of an aliphatic diol; 2 moles of an aliphatic triol and 7 to 8 moles of an organic diisocyanate. This mixture is heated in a range from about 50 to 120° C. until reaction is substantially complete. Resins are produced in this manner either separately or in situ with the elastomer. Thus, the resin of this invention is the reaction product of a diisocyanate and a mixture of diols and triols having an average of approximately 2.5 to 2.67 hydroxyl groups per mole with at least 50 mole per cent of said diols being a polypropylene ether glycol. Polypropylene glycol ether is preferred to polyethylene glycol ether in forming the resin since the former produces a cured coating with improved moisture resistance.

The pre-elastomer component suitable for use in the present invention is also of the isocyanato terminated polyurethane type. Commercial products of this type are produced by E. I. du Pont & Co. under the trade names Adiprene L-100, Adiprene L-167 and Adiprene LD-213. Adiprene L-100 has an average molecular weight of about 2000. It is the reaction product of 1 mole of polytetramethylene ether glycol and 2 moles of toluene diisocyanate (TDI).

It has been pointed out that it is desirable to minimize moisture which may contact the compositions since they react with it making them unsuitable for further use. It has been found that the shelf life of the polyurethane varnishes and enamels of this invention in containers may be vastly improved by incorporating molecular sieve particles in the container. The reaction of water with the compositions of the present invention is slow in comparison to the rate at which it is taken up by the molecular sieve particles. The physical form of the molecular sieve that is employed differs in the case of varnish from that of enamel. The varnish is intended to be clear so the sieve material is provided in pellets of suitable size such, for example, as $\frac{1}{16}$ inch in diameter. Such pellets do not suspend in the composition but fall to the bottom of the container. A variation on this is to secure the molecular sieve pellets to the inner surface of the cover and can in which the composition is stored so the vapor in the space above the composition is freed of moisture and that the drying means has adequate distribution for contacting the solution and the air above it.

Enamels contain pigments so the molecular sieve material is dispersed in finely divided form throughout the composition. This method insures uniform distribution and protection against moisture.

The amount of molecular sieve material adequate for the purposes described above is 0.5 to 5% and, preferably, 1 to 2% by weight of the composition.

Molecular sieves are made by Linde Air Products Company. They are alkali metal aluminosilicates. They are made highly water absorptive by driving off their water of hydration. Such sieves will absorb up to 22% of their weight of water. Three types may be used advantageously in the present inventions:

Type 4A:

$0.96 \pm 0.04$ NaO $\cdot 1.00$ Al$_2$O$_3 \cdot 1.92 \pm 0.09$ SiO$_2 \cdot x$H$_2$O Type 5A: (same as 4A but 75% of Na ions have been replaced by Ca ions)

Type 13X:

$0.83 \pm 0.05$ Na$_2$O $\cdot 1.00$ Al$_2$O$_3 \cdot 2.48 \pm 0.03$ SiO$_2 \cdot x$H$_2$O The type number gives the size of the pore opening in the sieve in Angstroms. The sieve particles are 1 to 5 microns. They may be pelleted by using an inert binder such as clay. About 20% of the total weight is sufficient binder.

Conventional pigments are used in the enamels of the presenst invention. The pigment particles are in the range 0.01 to 20 microns in amounts of about 1 to 50% by weight of the pigmented composition. Pigments which may be used include phthalocyanine blue, phthalocyanine green, lampblack, carbon black, zinc oxide, cadmium red, chrome yellow, molybdate orange, calcium carbonate and talc. The pigment selected may be treated before incorporation into the enamel to insure that no free moisture exists thereon.

The following examples are exemplary and not limiting of the present invention:

A polyurethane varnish was prepared as follows:

Polypropylene ether glycol (average MX 1038) __ 365.0
1,3 butylene glycol _____ 31.7
Trimethylol propane _____ 94.4
2,6-di-tert.-butyl-4-methylphenol _____ 9.3
Cellulose acetate butyrate _____ 9.3
Ethylene glycol monoethyl ether acetate _____ 827.5
Toluene _____ 50.0 are mixed together under a blanket of nitrogen gas and dried by azetropic distillation. The mixture was cooled to 25° C. 490 parts of toluene-2,4-diisocyanate was incorporated into the mixture and the resulting combination heated for 3 hours at 90°. 4.7 parts of 2,2'-dihydroxy-4,4'-dimethoxybenzophenone were added after the varnish cooled to room temperature as an ultra violet light absorber. 90 parts of Adiprene L–100 were also added. Adiprene L–100 is a liquid urethane polymer containing 4.0 to 4.3% by weight of isocyanato groups, having an average molecular weight of 4000 and having a viscosity of 14,000 to 19,000 cps at 86° F. When cured by exposure to atmospheric moisture Adiprene L–100 attains a tensile strength of 4000 p.s.i and an elongation of 660%.

The varnish prepared in this manner contained 41.6% solids, had a viscosity of 110 cps. at 80° F. and had 3.24% by weight of isocyanato groups or 7.78% by weight of the solids of isocyanato groups.

Comparison was made between varnishes not containing Adiprene and those of the present invention. The unmodified varnishes have good properties of hardness, flexibility, impact, strength and chemical resistance, but do not elongate sufficiently to be useful as coatings for exteriors. A varnish prepared as above, except that no modifier was added, has an elongation of 40%. When used to coat wood, cracks develop upon exposure to weather. The specific varnish, described hereinbefore in detail, has an elongation of 110%. Coatings on wood have weathered in Florida for 1 year and shown no sign of checking or cracking.

The varnishes of the present invention serve as a particularly desirable base for enamels. Pigment is added to the varnish in amounts depending upon the opacity and color characteristics desired. Generally, pigments are added in amounts, by weight of from 1 to 50%.

As indicated hereinbefore, the manner in which the molecular sieves are used for prolonging the shelf life differs between the varnish and enamel. In the varnish composition, as described hereinbefore in detail, the molecular sieves are in the form of pellets which do not remain suspended in the composition, but either collect on the bottom of the container, or are secured to the cover and sides of the container by means of a suitable bonding agent, such for example, as an epoxy resin. This insures good distribution of this drying means and permits the exposure of moisture laden air to drying if it seeps into the can even before it contacts the compositions of the present invention. It is to be remembered, however, that the sieve materials more readily pick up water than do the compositions of the present invention react with it. Thus, it is possible to prolong the shelf life of the present invention by simply providing molecular sieve material within the compositions. The use of container lined to some extent with it further increases their effect. Molecular sieve materials in amounts of 1 to 2% by weight of the varnish or enamel has proven statisfactory in prolonging their shelf life.

The enamels which carry the sieve material in them have a delay before curing takes place until the molecular sieves are saturated with moisture. Curing proceeds in the usual manner once this has occurred.

It has been found that the addition of pigment and drying means such as molecular sieve material does not substantially alter the desirable overall balanced combination of toughness, flexibility, hardness, chemical resistance and elongation.

A typical enamel formed in accordance with the present invention is now given:

| | |
|---|---|
| Varnish | 68 |
| Molecular sieve powder 4A | 3 |
| Titanium dioxide (rutile) | 29 |

The above composition was ground in a pebble mill for two days to attain a 7+ (NS) grind. The original viscosity was 450 centipoises. After two months the viscosity was unchanged and the settled pigment was readily redispersed. When the molecular sieve powder was omitted from the above composition, the enamel gelled after several days.

The invention in its broader aspects is not limited to the specific steps, means, compositions, combinations and improvements described, but departures may be made therefrom within the scope of the accompanying claims without departing from the principles of the invention and without sacrificing its chief advantages.

What is claimed is:

1. A varnish composition comprising a varnish base comprising the combination of a solid isocyanato terminated polyether polyurethane resin and from 3 to 50% by weight of said combination of an isocyanato terminated polyether polyurethane liquid pre-elastomer, said resin having by weight 4 to 15% isocyanato groups and being the reaction product of a diisocyanate and a mixture of diols and triols having an average of approximately 2.5 to 2.67 hydroxyl groups per mole, at least 50 mole percent of said diols being a polypropylene ether glycol, and said pre-elastomer having by weight 2 to 9% isocyanato groups and being the reaction product of a diisocyanate and a polytetramethylene ether glycol having an average of approximately 2 hydroxyl groups per mole.

2. An enamel composition having a varnish base as set forth in claim 1 wherein there is also included varnish pigment particles in the size range from 0.01 to 20 microns in amounts, by weight, from 1 to 50% of the enamel composition.

3. An enamel composition as set forth in claim 1 wherein there is dispersed 0.5 to 5% by weight of the composition an alkali metal aluminosilicate sieve material having a pore opening in the range of about 4 to 13 angstroms.

References Cited by the Examiner

UNITED STATES PATENTS 3,012,987  12/1961  Ansul _____ 260—858

FOREIGN PATENTS 665,361  6/1963  Canada.

OTHER REFERENCES

Federation of Paint and Varnish Production Clubs, Official Digest, Vol. 3, Remington et al., May 1959, pp. 612–623.

"General Information . . . " Form 8605A of the Linde Co., Linde, 8 pages.

MORRIS LIEBMAN, *Primary Examiner.*

A. H. KOECKERT, *Assistant Examiner.*